Patented Nov. 6, 1923.

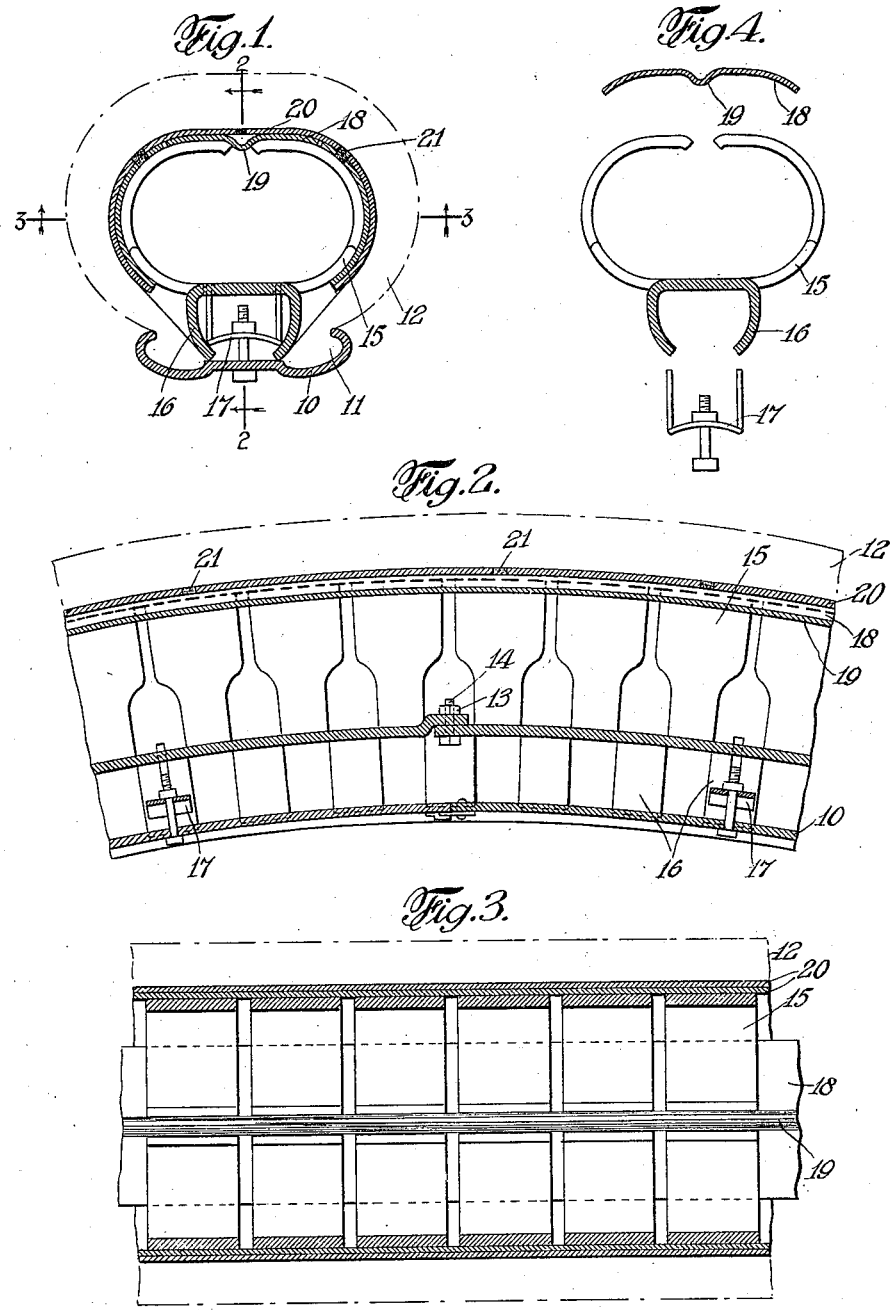

1,473,414

UNITED STATES PATENT OFFICE.

JOHN M. ABRAMS, OF BROOKLYN, NEW YORK.

RESILIENT TIRE.

Application filed April 2, 1923. Serial No. 629,344.

*To all whom it may concern:*

Be it known that I, JOHN M. ABRAMS, a citizen of the United States, and a resident of Brooklyn, in the county of Kings and State of New York, have invented certain new and useful Improvements in Resilient Tires, of which the following is a specification.

The invention relates to a vehicle tire, more particularly to a tire possessing proper resiliency and long life; and it is composed of an outer rubber and fabric shoe or casing of the usual or special type, a metal substitute for the usual pneumatic tube and, if desired, an inner protector between the shoe and metal substitute.

It has for its object to provide a tire which shall possess the advantages of the well-known pneumatic tire, yet have none of the disadvantages thereof and which shall have improved load distributing facilities. The invention relates more especially to a tire of the character described and shown in my prior U. S. Letters Patent Nos. 1,392,671, 1,392,672 and 1,401,948; and consists in associating with the resilient riser portion of the substitute metal member a ring member for better distributing the load upon the tire as well as for strengthening to the proper extent the resilient structure as a whole.

The nature of the invention, however, will best be understood when described in connection with the accompanying drawings, in which—

Fig. 1 is a transverse section thru the tire and rim.

Figs. 2 and 3 are fragmentary sectional views taken respectively on the lines 2—2, and 3—3, Fig. 1, looking in the direction of the arrows.

Fig. 4 is a detached view illustrating the parts composing the resilient metal member and the associated load distributing member.

Similar characters of reference designate corresponding parts thruout the several views.

Referring to the drawings, 10 designates the rim of a vehicle wheel and is shown turned upwardly along the two outer edges to receive corresponding beads 11 of the shoe portion 12 of the tire. The rim constitutes the tire supporting portion of a wheel (not shown); and the said shoe may be of any well-known or special construction and is to be held to the said rim in any suitable manner.

The usual pneumatic tube employed in connection with a shoe in tires of this character is dispensed with in the improved tire; and the same is replaced by a circular metal filler member disposed within the casing and having its two ends suitably secured as by means of nuts 13 and bolts 14 and the former being preferably permanently fixed to one of the ends. Risers 15 and drops 16 are provided by this strip, as more particularly set forth in my aforementioned U. S. Letters Patent, the risers being turned outwardly and over transversely of the shoe while the drops are turned inwardly and under transversely of the shoe. The co-operating risers 15, moreover, do not quite close at their ends but afford a slight separation. The said resilient member provided with the risers and drops is designed thru the latter to lock the shoe to the rim by means of a locking or wedging member 17, similarly to the arrangement set forth in the said Letters Patent.

In accordance with the invention, there is provided over the upper portions of the risers an annular load distributing member 18. This member consists of a band of non-resilient metal suitably secured at the ends and is designed to contact thruout the tire substantially with the outer ends of the risers and is of sufficient width to cover substantially the upper turned-over portion. It is, also, preferably provided with a circular depression forming a ridge 19 designed to fit between the separated ends of the risers to be held thereby in place relatively to the said risers.

As in the embodiment set forth in the aforesaid Letters Patent, it is preferred to make use of a protector member 20 of leather or composition, the same being inserted over the risers and annular member and between the latter and the casing. In order further to position the annular member and to conform the outer surface of the protector 20 to the inner surface of the shoe, the said protector is recessed along its inner surface to accommodate the metal of the annular member 18. This is best effected by constructing the protector of laminations, for example of the thickness of the metal of the annular member and omitting a portion of the inner lamination for the accommodation of the said annular member, as shown. The laminations are, furthermore, provided with registering perforations 21 which are designed to receive a suitable filler material, as a cement, serving not only to insure the laminations against sliding upon each other, but to increase the wear-resistance of the protector.

In the provision of the said annular member between the shoe (protector) and resilient risers, the load upon the tire is more uniformly distributed and any tendency of loosening of shoe and fabric from the resilient metallic support member due to flattening by ground resistance, will be taken up by the transmission of the pressure thru the non-resilient annular member.

I claim:—

1. In a vehicle tire: the combination with a rim and a shoe or casing carried by same, a metal member extending thruout the interior of the casing and having risers and drops extending respectively outwardly and inwardly as well as transversely of the shoe, and means to retain the metal member and shoe to the rim; of an annular metal member surrounding the outer portions of the risers between same and the shoe.

2. In a vehicle tire: the combination with a rim and a shoe or casing carried by same, a metal member extending thruout the interior of the casing and having risers and drops extending respectively outwardly and inwardly as well as transversely of the shoe, and means to retain the metal member and shoe to the rim; of a non-resilient annular metal member surrounding the outer portions of the risers between same and the shoe.

3. In a vehicle tire: the combination with a rim and a shoe or casing carried by same, a metal member extending thruout the interior of the casing and having risers and drops extending respectively outwardly and inwardly as well as transversely of the shoe, and means to retain the metal member and shoe to the rim; of a non-resilient annular member surrounding the outer portions of the risers and provided with means adapted to fit between the ends of cooperating risers.

4. In a vehicle tire: the combination with a rim and a shoe or casing carried by same, a metal member extending thruout the interior of the casing and having risers and drops extending respectively outwardly and inwardly as well as transversely of the shoe, and means to retain the metal member and shoe to the rim; of a non-resilient annular member surrounding the outer portions of the risers and provided with a circular depression to afford a ridge adapted to fit between the separated ends of cooperating risers.

5. In a vehicle tire: the combination with a rim and a shoe or casing carried by same, a metal member extending thruout the interior of the casing and having risers and drops extending respectively outwardly and inwardly as well as transversely of the shoe, and means to retain the metal member and shoe to the rim; of a non-resilient annular member surrounding the outer portions of the risers, and a protector member over said annular member and risers and located between the former and the shoe.

6. In a vehicle tire: the combination with a rim and a shoe or casing carried by same, a metal member extending thruout the interior of the casing and having risers and drops extending respectively outwardly and inwardly as well as transversely of the shoe, and means to retain the metal member and shoe to the rim; of a non-resilient annular member surrounding the outer portions of the risers, and a laminated protector member over said annular member and risers, having a portion of its inner lamination removed to accommodate the annular member.

7. In a vehicle tire: the combination with a rim and a shoe or casing carried by same, a metal member extending thruout the interior of the casing and having risers and drops extending respectively outwardly and inwardly as well as transversely of the shoe, and means to retain the metal member and shoe to the rim; of a laminated protector member between said risers and casing, the said laminations being provided with holes, and wear-resisting filling material within said holes.

8. In a vehicle tire: the combination with a rim and a shoe or casing carried by same, a metal member extending thruout the interior of the casing and having risers and drops extending respectively outwardly and inwardly as well as transversely of the shoe, and means to retain the metal member and shoe to the rim; of a non-resilient annular member surrounding the outer portions of the risers, a laminated protector member over said annular member and risers, the laminations being provided with registering holes, and wear-resisting filling material within said holes.

Signed at Brooklyn, in the county of Kings and State of New York, this 28th day of March, A. D. 1923.

JOHN M. ABRAMS.